(12) United States Patent
Fisher

(10) Patent No.: US 10,902,399 B2
(45) Date of Patent: Jan. 26, 2021

(54) USING A MOBILE DEVICE FOR POINT OF ENTRY NFC TRANSACTIONS

(75) Inventor: Michelle Fisher, Oakland, CA (US)

(73) Assignee: Michelle Fisher, Berkeley, CA (US)

( * ) Notice: Subject to any disclaimer, the term of this patent is extended or adjusted under 35 U.S.C. 154(b) by 0 days.

(21) Appl. No.: 12/592,581

(22) Filed: Nov. 25, 2009

(65) Prior Publication Data
US 2010/0161403 A1    Jun. 24, 2010

Related U.S. Application Data

(63) Continuation of application No. 11/467,441, filed on Aug. 25, 2006, now abandoned.
(Continued)

(51) Int. Cl.
| | | |
|---|---|---|
| G06Q 20/20 | (2012.01) | |
| G06Q 20/32 | (2012.01) | |
| G06Q 30/02 | (2012.01) | |
| G06Q 20/10 | (2012.01) | |
| G06Q 20/42 | (2012.01) | |
| H04W 4/80 | (2018.01) | |

(Continued)

(52) U.S. Cl.
CPC ......... *G06Q 20/202* (2013.01); *G06Q 20/102* (2013.01); *G06Q 20/20* (2013.01); *G06Q 20/204* (2013.01); *G06Q 20/32* (2013.01); *G06Q 20/325* (2013.01); *G06Q 20/327* (2013.01); *G06Q 20/3226* (2013.01); *G06Q 20/3227* (2013.01); *G06Q 20/3278* (2013.01); *G06Q 20/387* (2013.01); *G06Q 20/401* (2013.01); *G06Q 20/425* (2013.01); *G06Q 30/0238* (2013.01); *H04W 4/80* (2018.02)

(58) Field of Classification Search
USPC ....................................................... 455/552.1
See application file for complete search history.

(56) References Cited

U.S. PATENT DOCUMENTS

| | | | | |
|---|---|---|---|---|
| 6,038,367 | A | 3/2000 | Abecassis | ........................ 386/46 |
| 6,101,483 | A | 8/2000 | Petrovich | |

(Continued)

FOREIGN PATENT DOCUMENTS

| | | |
|---|---|---|
| EP | 1503352 | 2/2005 |
| WO | WO 2006095212 A1 | 9/2006 |

OTHER PUBLICATIONS

Office Action for U.S. Appl. No. 11/939,821 dated Aug. 17, 2010.
(Continued)

*Primary Examiner* — Steven S Kelley

(57) ABSTRACT

The present invention provides a method and apparatus for completing a transaction using a wireless mobile communication channel and another communication channel, particularly another communication channel that provides for near field radio channels (NFC), as well as other communication channels, such as Bluetooth or WIFI. The present invention also provides a method of completing a transaction in which a management server assists a transaction server and a point of sale terminal in forwarding transaction information to a hand-held mobile device, with the transaction having originated from the hand-held mobile device. There is also provided a hand-held mobile device that wirelessly communicates between a secure element and a radio element that are associated with the hand-held mobile device.

26 Claims, 9 Drawing Sheets

Related U.S. Application Data

(60) Provisional application No. 60/766,171, filed on Dec. 31, 2005, provisional application No. 60/766,172, filed on Dec. 31, 2005.

(51) Int. Cl.
    *G06Q 20/38* (2012.01)
    *G06Q 20/40* (2012.01)

(56) References Cited

U.S. PATENT DOCUMENTS

| | | |
|---|---|---|
| 6,115,601 A | 9/2000 | Ferreira |
| 6,123,259 A | 9/2000 | Ogasawara |
| 6,128,655 A | 10/2000 | Fields et al. ............... 709/219 |
| 6,141,666 A | 10/2000 | Tobin ............................ 707/513 |
| 6,199,082 B1 | 3/2001 | Ferrel et al. ................. 707/522 |
| 6,250,557 B1 | 6/2001 | Forslund |
| 6,415,156 B1 | 7/2002 | Stadelmann ................. 455/466 |
| 6,450,407 B1 | 9/2002 | Freeman |
| 6,587,835 B1 | 7/2003 | Treyz |
| 6,605,120 B1 | 8/2003 | Fields et al. ................. 715/513 |
| 6,771,981 B1 | 8/2004 | Zalewski et al. ............ 455/557 |
| 6,772,396 B1 | 8/2004 | Cronin et al. ............... 715/523 |
| 6,886,017 B1 | 4/2005 | Jackson et al. .............. 707/104 |
| 6,950,939 B2 | 9/2005 | Tobin ............................ 713/182 |
| 7,069,248 B2 | 6/2006 | Huber ............................ 705/64 |
| 7,031,945 B1 | 8/2006 | Donner .......................... 705/64 |
| 7,096,003 B2 | 8/2006 | Joao et al. ..................... 455/406 |
| 7,110,744 B2 | 9/2006 | Freeny, Jr. .................... 455/406 |
| 7,110,792 B2 | 9/2006 | Rosenberg ..................... 455/558 |
| 7,127,236 B2 | 10/2006 | Khan et al. ................. 455/414.1 |
| 7,200,578 B2 | 4/2007 | Paltenghe |
| 7,289,810 B2 | 10/2007 | Jagadeesan et al. .......... 455/439 |
| 7,308,254 B1 | 12/2007 | Rissanen ..................... 455/414.1 |
| 7,379,920 B2 | 5/2008 | Leung et al. .................. 705/67 |
| 7,392,226 B1 | 6/2008 | Sasaki |
| 7,357,312 B2 | 8/2008 | Gangi .......................... 235/380 |
| 7,472,829 B2 | 1/2009 | Brown ....................... 235/382.5 |
| 7,482,925 B2 | 1/2009 | Hammad et al. ............ 340/572.1 |
| 7,493,284 B2 | 2/2009 | Celi, Jr. et al. |
| 7,512,567 B2 | 3/2009 | Bemmel |
| 7,522,905 B2 | 4/2009 | Hammad et al. ............. 455/410 |
| 7,600,675 B2 | 10/2009 | Petralia et al. |
| 7,628,322 B2 | 12/2009 | Holtmanns et al. |
| 7,784,684 B2 | 8/2010 | Labrou |
| 7,870,077 B2 | 1/2011 | Woo |
| 7,979,519 B2 | 7/2011 | Shigeta |
| 8,005,426 B2 | 8/2011 | Huomo |
| 8,019,362 B2 | 9/2011 | Sweatman |
| 8,073,424 B2 | 12/2011 | Sun |
| 8,086,534 B2 | 12/2011 | Powell |
| 8,109,444 B2 | 2/2012 | Jain |
| 8,121,945 B2 | 2/2012 | Rackley |
| 8,127,984 B2 | 3/2012 | Zatloukal |
| 8,290,433 B2 | 10/2012 | Fisher et al. |
| 8,332,272 B2 | 12/2012 | Fisher |
| 8,352,323 B2 | 1/2013 | Fisher |
| 8,566,239 B2 | 10/2013 | Arthur |
| 9,294,917 B2 | 3/2016 | Nystrom |
| 2001/0011250 A1 | 8/2001 | Paltenghe |
| 2001/0044751 A1 | 11/2001 | Pugliese |
| 2002/0025797 A1 | 2/2002 | Joao et al. |
| 2002/0056091 A1 | 5/2002 | Bala |
| 2002/0059100 A1 | 5/2002 | Shore |
| 2002/0063895 A1 | 5/2002 | Agata |
| 2002/0065774 A1 | 5/2002 | Young |
| 2002/0077918 A1 | 6/2002 | Lerner |
| 2002/0082879 A1 | 6/2002 | Miller et al. ..................... 705/5 |
| 2002/0107756 A1 | 8/2002 | Hammons et al. ............ 705/26 |
| 2002/0160761 A1 | 10/2002 | Wolfe |
| 2002/0169984 A1 | 11/2002 | Kumar |
| 2003/0061113 A1 | 3/2003 | Petrovich |
| 2003/0065805 A1 | 4/2003 | Barnes |
| 2003/0074259 A1 | 4/2003 | Slyman |
| 2003/0085286 A1 | 5/2003 | Kelley |
| 2003/0087601 A1 | 5/2003 | Agam |
| 2003/0093695 A1 | 5/2003 | Dutta |
| 2003/0105641 A1 | 6/2003 | Lewis ............................... 705/1 |
| 2003/0132298 A1 | 7/2003 | Swartz |
| 2003/0140004 A1 | 7/2003 | O'Leary |
| 2003/0163359 A1 | 8/2003 | Kanesaka |
| 2003/0172028 A1 | 9/2003 | Abell et al. ..................... 705/40 |
| 2004/0006497 A1 | 1/2004 | Nestor et al. .................... 705/5 |
| 2004/0029569 A1 | 2/2004 | Khan et al. |
| 2004/0030658 A1 | 2/2004 | Cruz |
| 2004/0034544 A1 | 2/2004 | Fields et al. |
| 2004/0064408 A1 | 4/2004 | Kight |
| 2004/0073497 A1 | 4/2004 | Hayes |
| 2004/0127256 A1 | 7/2004 | Goldthwaite |
| 2004/0235450 A1* | 11/2004 | Rosenberg ..................... 455/406 |
| 2004/0235502 A1* | 11/2004 | Kim ............................... 455/466 |
| 2004/0243519 A1* | 12/2004 | Perttila et al. .................. 705/75 |
| 2004/0254836 A1 | 12/2004 | Emoke Barabas |
| 2004/0267618 A1* | 12/2004 | Judicibus ............... G06Q 20/00 705/16 |
| 2004/0267665 A1 | 12/2004 | Nam |
| 2005/0003810 A1 | 1/2005 | Chu |
| 2005/0040230 A1 | 2/2005 | Swartz |
| 2005/0076210 A1 | 4/2005 | Thomas et al. ................ 713/165 |
| 2005/0143051 A1* | 6/2005 | Park ........................ H04L 12/66 455/406 |
| 2005/0165646 A1 | 7/2005 | Tedesco |
| 2005/0187873 A1 | 8/2005 | Labrou |
| 2005/0215231 A1 | 9/2005 | Bauchot et al. .............. 455/405 |
| 2005/0242171 A1 | 11/2005 | Smets et al. |
| 2006/0000900 A1 | 1/2006 | Fernandes |
| 2006/0022033 A1 | 2/2006 | Smets et al. |
| 2006/0031752 A1 | 2/2006 | Surloff |
| 2006/0065741 A1 | 3/2006 | Vayssiere |
| 2006/0089874 A1 | 4/2006 | Newman |
| 2006/0143091 A1 | 6/2006 | Yuan |
| 2006/0169768 A1 | 8/2006 | Gangi |
| 2006/0191995 A1 | 8/2006 | Stewart |
| 2006/0206709 A1 | 9/2006 | Labrou et al. ................ 713/167 |
| 2006/0219780 A1 | 10/2006 | Swartz |
| 2006/0253389 A1* | 11/2006 | Hagale ..................... G06Q 20/10 705/39 |
| 2006/0287004 A1 | 12/2006 | Fuqua |
| 2007/0004391 A1 | 1/2007 | Maffeis |
| 2007/0011099 A1 | 1/2007 | Sheehan |
| 2007/0022058 A1 | 1/2007 | Labrou |
| 2007/0075133 A1 | 4/2007 | Yeager |
| 2007/0095892 A1* | 5/2007 | Lyons et al. ................... 235/379 |
| 2007/0125838 A1 | 6/2007 | Law |
| 2007/0125840 A1 | 6/2007 | Law |
| 2007/0138299 A1 | 6/2007 | Mitra |
| 2007/0145135 A1 | 6/2007 | Jogand-Coulomb |
| 2007/0131759 A1 | 7/2007 | Cox |
| 2007/0156436 A1 | 7/2007 | Fisher |
| 2007/0210155 A1 | 9/2007 | Swartz |
| 2007/0235519 A1 | 10/2007 | Jang |
| 2007/0235539 A1 | 10/2007 | Sevanto |
| 2007/0255662 A1 | 11/2007 | Tumminaro ..................... 705/79 |
| 2007/0262138 A1 | 11/2007 | Somers et al. |
| 2007/0262139 A1 | 11/2007 | Fiebiger |
| 2007/0270166 A1 | 11/2007 | Hampel |
| 2007/0278290 A1 | 12/2007 | Messerges et al. |
| 2007/0293155 A1 | 12/2007 | Liao |
| 2008/0010190 A1 | 1/2008 | Rackley |
| 2008/0010196 A1 | 1/2008 | Rackley |
| 2008/0017704 A1 | 1/2008 | Vandeburg |
| 2008/0045172 A1 | 2/2008 | Narayanaswami |
| 2008/0046258 A1* | 2/2008 | Mechaley .............. G06Q 20/4037 705/17 |
| 2008/0046366 A1 | 2/2008 | Bemmel |
| 2008/0048022 A1 | 2/2008 | Vawter |
| 2008/0051059 A1 | 2/2008 | Fisher |
| 2008/0051142 A1 | 2/2008 | Calvet et al. ................. 455/558 |
| 2008/0052192 A1 | 2/2008 | Fisher |
| 2008/0052233 A1 | 2/2008 | Fisher |
| 2008/0054078 A1 | 3/2008 | Tanner |
| 2008/0116264 A1 | 5/2008 | Hammad et al. |
| 2008/0139155 A1 | 6/2008 | Boireau et al. ............... 455/296 |
| 2008/0167988 A1 | 7/2008 | Sun et al. ....................... 705/39 |

(56) References Cited

U.S. PATENT DOCUMENTS

| | | | |
|---|---|---|---|
| 2008/0177668 A1 | 7/2008 | Delean | 705/76 |
| 2008/0208681 A1 | 8/2008 | Hammad et al. | 705/13 |
| 2008/0208743 A1 | 8/2008 | Arthur et al. | 705/41 |
| 2008/0208744 A1 | 8/2008 | Arthur et al. | 705/41 |
| 2008/0208762 A1 | 8/2008 | Arthur et al. | 705/79 |
| 2008/0221997 A1 | 9/2008 | Wolfe | |
| 2008/0255947 A1 | 10/2008 | Friedman | |
| 2008/0275779 A1 | 11/2008 | Lakshminarayanan | 705/14 |
| 2008/0294556 A1 | 11/2008 | Anderson | 705/44 |
| 2008/0305774 A1 | 12/2008 | Ramakrishna | 455/412.1 |
| 2009/0063312 A1 | 3/2009 | Hurst | |
| 2009/0075592 A1* | 3/2009 | Nystrom et al. | 455/41.1 |
| 2009/0098825 A1 | 4/2009 | Huomo et al. | 455/41.1 |
| 2009/0104888 A1 | 4/2009 | Cox | |
| 2009/0106112 A1 | 4/2009 | Dalmia | |
| 2009/0124234 A1 | 5/2009 | Fisher | |
| 2009/0132362 A1 | 5/2009 | Fisher | |
| 2009/0143104 A1 | 6/2009 | Loh | |
| 2009/0144161 A1 | 6/2009 | Fisher | |
| 2009/0227281 A1 | 9/2009 | Hammad | |
| 2010/0057619 A1 | 3/2010 | Weller | |
| 2010/0063895 A1 | 3/2010 | Dominguez | |
| 2011/0047036 A1 | 2/2011 | Foran-Owens et al. | |
| 2011/0320316 A1 | 12/2011 | Randazza | |
| 2015/0012440 A1 | 1/2015 | Kelley | |

OTHER PUBLICATIONS

Office Action for U.S. Appl. No. 11/933,351 dated Aug. 18, 2010.
U.S. Appl. No. 13/620,632, Office Action dated Sep. 14, 2012, 10 p.
U.S. Appl. No. 15/175,150, Notice of Allowance dated Apr. 5, 2017, 5 p.
U.S. Appl. No. 11/933,367, Office Action dated May 27, 2010, 8 p.
1739369(MasterCard PayPass.pdf athttps://www.google.co.kr/search?q=MasterCard.+PayPass+Mag+Stripe%2C+Acquirer+Implementation+Requirements&newwindow=1&biw=1851&bih=973&source=lnt&tbs=cdr%3A1%2Ccd_min%3A%2Ccd_max%3A8%2F24%2F2006&tbm=#newwindow=1&tbs=cdr:1,cd_max:8/24/2006&q=MasterCard%C2%AEPayPass%E2%84%A2+mag+stripe,+acquirer+Implementation+requirements&spf=1495411706977.
"Is near-field communication close to success?" article dated Mar. 2006 at http://ieeexplore.ieee.org/document/1607943/.
"Room6_150pm_munro.pdf" at http://www.rfidjournal.net/live05/monday/.
Wikipedia Infrared https://en.wikipedia.org/wiki/Infrared_Data_Association.
Wikiepedia Bluetooth http://nearfieldcommunication.org/bluetooth.html.
Wikipedia NFC https://en.wikipedia.org/wiki/Near-field_communication.
RF wireless comparison of NFC vs RFID http://www.rfwireless-world.com/Terminology/NFC-vs-RFID-vs-Bluetooth-vs-wifi.html.
Office Action for U.S. Appl. No. 11/933,351 dated Oct. 3, 2008.
Office Action for U.S. Appl. No. 11/948,903 dated Feb. 2, 2009.
Office Action for U.S. Appl. No. 11/467,441 dated May 27, 2009.
Office Action for U.S. Appl. No. 11/933,351 dated Jul. 8, 2009.
Office Action for U.S. Appl. No. 11/948,903 dated Nov. 12, 2009.
Office Action for U.S. Appl. No. 11/933,321 dated May 27, 2010.
Office Action for U.S. Appl. No. 11/933,337 dated May 27, 2010.
Office Action for U.S. Appl. No. 11/933,367 dated May 27, 2010.
U.S. Appl. No. 12/592,581, Final Office Action dated Jul. 20, 2017, 16 p.
U.S. Appl. No. 12/592,581, Appeal Decision mailed Nov. 1, 2016, 15 p.
U.S. Appl. No. 14/627,969, Final Office Action dated Dec. 1, 2017, 13 p.
U.S. Appl. No. 14/686,695 Notice of Allowance dated Oct. 12, 2017 11 p.
U.S. Appl. No. 14/867,838 Final Office Action dated Dec. 28, 2017 13p.
"Triple Des" https://en.wikipedia.org/wiki/Triple_DES.
"Public key" https://en.wikipedia.org/wiki/Public-key_cryptography.
"Credit Card"—https://en.wikipedia.org/wiki/Credit_card.
"Payment card number" https://en.wkipedia.org/wiki/Payment_card_number.
"Credi Card Fraud"—https://en.m.wikipedia.org/wiki/Credit_card_fraud.
"Issuing Bank"—https://en.wikipedia.org/wiki/issuing_bank.
"Acquiring Bank"—https://en.wikipedia.org/wiki/Acquiring_bank.
"Text Messaging"—https://en.m.wikpedia.org/wiki/Text_messaging.
"Graphical User Interface"—https://en.m.wikipedia.org/wiki/Graphical_user_interface.
"Web Browser"—https://techterms.com/definition/web_browser.
"Java Script"—https://techterms.co_m/definition/javascript.
"MasterCard Pay Pass" 1739369(MasterCard PayPass).pdf.
Is near-field communication close to success?—https://ieeexplore.ieee.org/document/1607943/?arnumber=1607943.
"Room6_150pm_munro.pdf"—http://www.rfidjournal.net/live05/monday/.

* cited by examiner

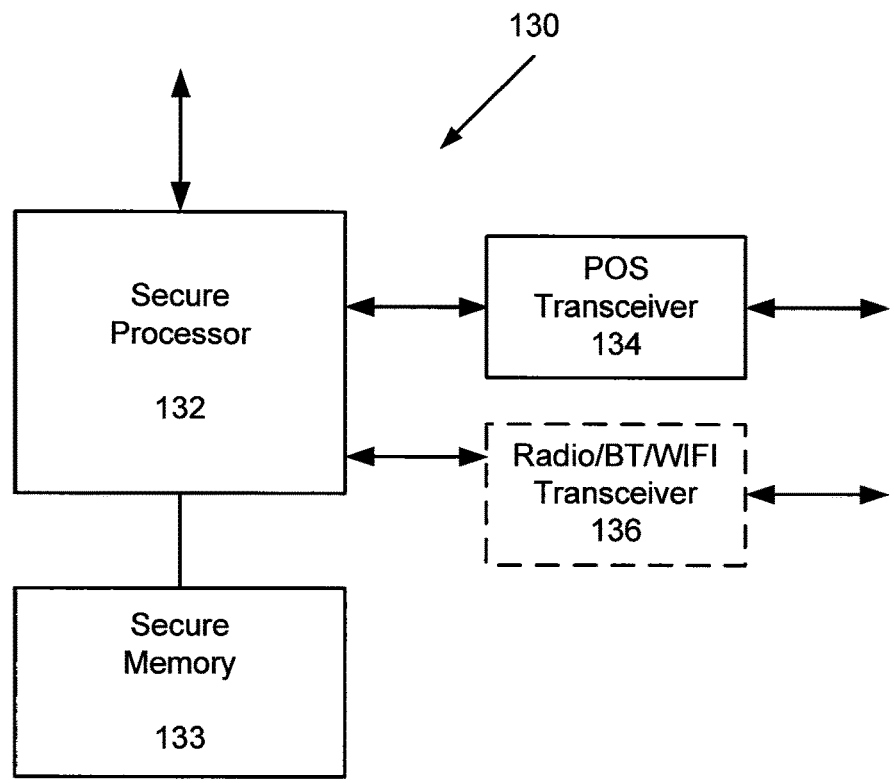
Fig. 2B1
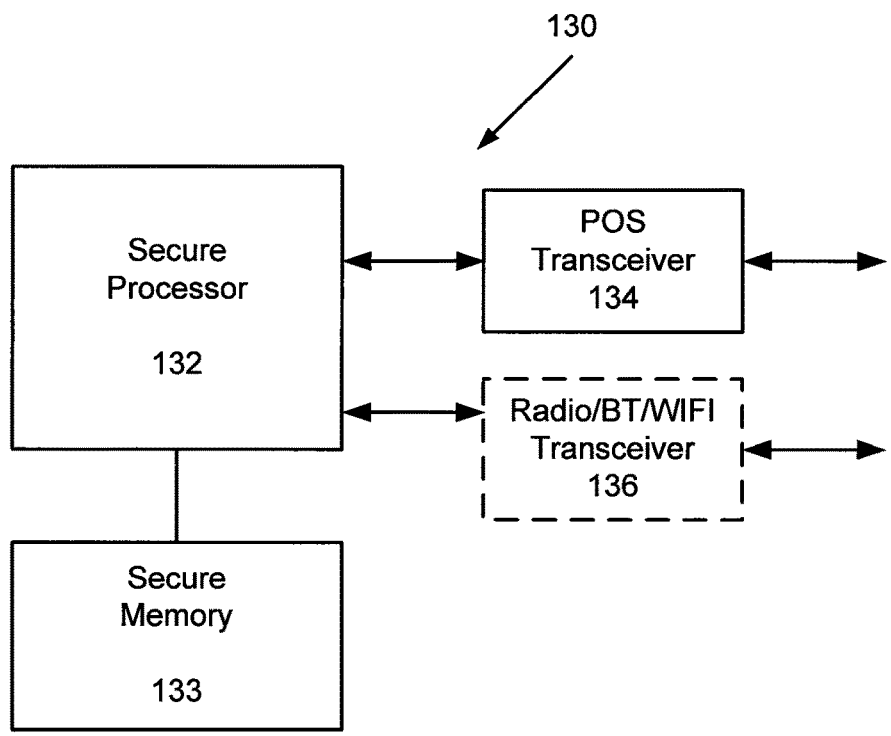
Fig. 2B2A

Fig. 2B2B

USING A MOBILE DEVICE FOR POINT OF ENTRY NFC TRANSACTIONS

CLAIM OF PRIORITY

This invention is a continuation of U.S. patent application Ser. No. 11/467,441 filed Aug. 25, 2006, entitled "Method and Apparatus for Completing a Transaction Using a Wireless Mobile Communication Channel and Another Communication Channel" which claims the benefit of U.S. Provisional Application Ser. No. 60/766,171 filed Dec. 31, 2005, entitled "Mobile Credit Card Account Installer" and U.S. Provisional Application Ser. No. 60/766,172 filed Dec. 31, 2005 entitled "Mobile Ticket" and are expressly incorporated by reference.

FIELD OF THE INVENTION

The present invention relates to a method and apparatus for completing a transaction using a wireless mobile communication channel and another communication channel, particularly another communication channel that provides for near field radio channels (NFC), as well as other communication channels, such as Bluetooth or WIFI.

BACKGROUND OF THE INVENTION

Online transactions, such as for purchasing goods or receiving downloads or tickets, which involve personal computers and the Internet are well known. Further, mobile wireless communication devices, such as cell phones, blackberries or other personal digital assistants are also being used for making transactions.

For example, U.S. Patent Application No. US/2003/0172028 provides a description of a personal payment system that utilizes a wireless enabled device such as a cell phone. As described, this system interacts using a Bluetooth protocol with a terminal located nearby.

In another example, U.S. Pat. No. 7,031,945 describes a system and method that provides an electronic ticket to a smart card or standard wireless device that is identified with a user's account.

Further, wireless mobile devices that include a near field communication (NFC) device, coupled with some type of transaction device having a code, such as a smart card that uses an RFID for identification purposes, allow for debit cards to securely make a simple transaction, such as purchasing a bus ticket, by simply waving the wireless mobile device near a reader installed on the bus, so that the bus fare is deducted from a total amount that is available stored on the smart card of the wireless mobile device, or by forwarding the fare to a server that can identify the identification code of the particular RFID and then subsequently charge the user.

While the above exemplary references illustrate that certain simple transactions are possible and known using mobile wireless communication devices, one problem associated with them is that they are not typically useful in a wide range of different areas, but are tied to a specific platform. For example, NFC devices are only usable with NFC readers, which are not common at present. Another problem is that other mobile wireless communication devices have very limited ability to be used in transactions.

The present invention attempts to overcome the above and other problems.

SUMMARY OF THE INVENTION

The present invention provides a method and apparatus for completing a transaction using a wireless mobile communication channel and another communication channel, particularly another communication channel that provides for near field radio channels (NFC), as well as other communication channels, such as Bluetooth or WIFI.

In one aspect of the invention, the present invention provides a method of completing a transaction in which a management server assists a transaction server and a point of sale terminal in forwarding transaction information to a hand-held mobile device, with the transaction having originated from the hand-held mobile device.

In another aspect of the invention, there is provided a hand-held mobile device that wirelessly communicates between a secure element and a radio element that are associated with the hand-held mobile device.

In still another aspect of the invention there is provided a hand-held mobile device that has a secure element that is insertable into a body of the hand-held mobile device, to thereby allow for wired communication between the secure element and a radio element of the hand-held mobile device.

A method according to the invention includes the steps of sending a first transaction request signal from a first transceiver to any one of a plurality of conventional point-of-sale terminals using a first communication channel, the transaction request signal including an identifier stored in the secure memory and that is associated with the user of the hand-held mobile device, thereby causing the one conventional point-of-sale terminal to transmit the transaction request signal to a transaction server that is remote from the point-of-sale device;

receiving from a management server a first transaction response signal at the second transceiver over a second communication channel that is different than the first communication channel, wherein the management server obtains transaction data from a transaction server, associates the transaction data with the user, and provides at least some of the transaction data as the first transaction response signal to the second transceiver; and displaying at least some of the first transaction response signal on the visual display associated with the hand-held mobile device.

In another embodiment is described a system for assisting a user to complete a transaction. The system comprises a hand-held mobile device, the hand-held mobile device having: a processor; a secure memory coupled to the processor; a first transceiver coupled to the processor and adapted to send transaction request signals and receive transaction response signals over a first communication channel, the transaction request signals and the transaction response signals associated with the transaction; a visual display coupled to the processor; and a second radio transceiver coupled to the processor and adapted to send outgoing voice and data signals and receive incoming voice and data signals over a second communication channel that is different than the first communication channel, the incoming and outgoing data signals including transaction signals associated with the transaction. Included in the system is also a point-of-sale terminal that receives one of the transaction request signals and transmits the one transaction request signal to the transaction server; a transaction server that receives the one transaction request signal from the point-of-sale terminal, verifies the transaction, and forwards a transaction verification signal to the management server; and a management server that receives the transaction verification signal, identifies the user corresponding thereto, and provides as one of the transaction signals a first transaction response signal to the second radio transceiver.

BRIEF DESCRIPTION OF THE DRAWINGS

These and other aspects and features of the present invention will become apparent to those of ordinary skill in the art upon review of the following description of specific embodiments of the invention in conjunction with the accompanying figures, wherein:

FIGS. 2A, 2B1, 2B2A, 2B2B and 2C illustrate mores details regarding certain of the components illustrated in FIG. 1;

DETAILED DESCRIPTION OF THE PREFERRED EMBODIMENTS

Figure 1:
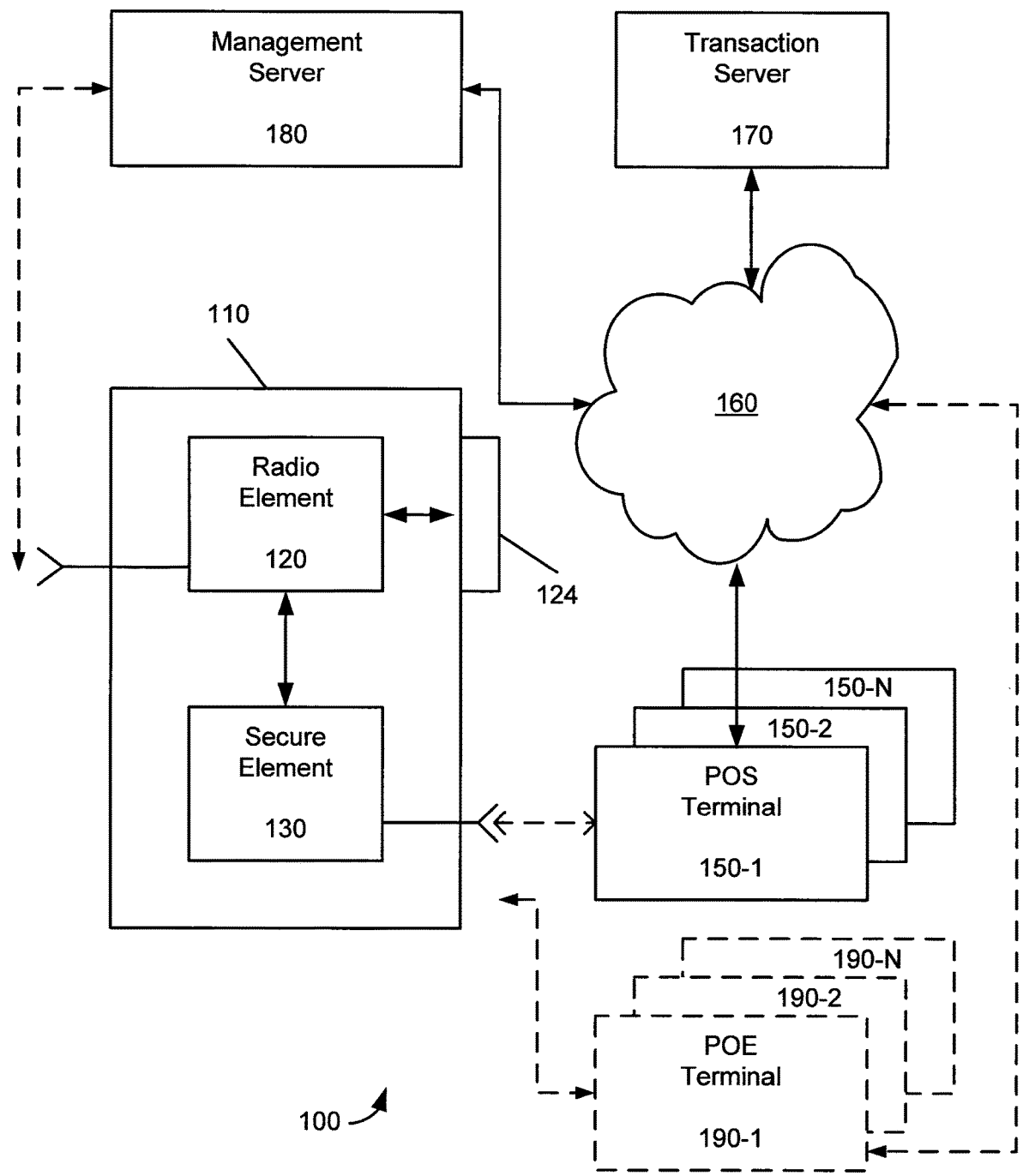
FIG. 1 illustrates an overview block diagram of the system according to the present invention.

The present invention provides a system and method for assisting a user to complete a transaction. A preferred embodiment of the system is illustrated in FIG. 1.

One feature of the system 100 is the hand-held mobile device 110. The mobile device 110 includes a radio element 120 and a secure element 130. A display 124 is shown associated with the radio element 120, and antennas, not labeled, are shown as associated with each of the radio element 120 and the secure element 130, although it is noted that the illustration of antenna can physically be implemented in a manner that is different from the wireless antenna shown, such as by a stripe is passed along a reader, or some other transmission mechanism. Although elements 120 and 130 are shown as distinct and separate, and display 124 is shown as connected to the radio element 120, it will be understood that other configurations are within the scope of the invention, in particular, a combination in which a single processor is used to execute the functions that are currently performed and described herein as being provided by both the radio element 120 and the secure element 130, as described further herein. Further as illustrated in FIG. 1, both the radio element 120 and the secure element 130 are internal to the mobile device 110 as illustrated, although in certain embodiments the secure element 130 can be external to the mobile device 110, as described hereinafter. Also, various different functionalities can be included within the radio element 120 and the secure element 130, as also described hereinafter.

As an overview, the mobile device 110 has the functionality to communicate with one of many different a point of sale (POS) terminals 150-1 to 150-n, preferably in a contactless manner using some type of wireless protocol, as mentioned hereinafter. It can also similarly communicate with one of many point of entry (POE) terminals 190-1 to 190-n.

The point-of-sale terminal 150 receives one of the transaction request signals from the mobile device 110 and transmits the one transaction request signal to the transaction server 170, typically using a communication channel 160 such as the internet. The transaction server 170 that receives the one transaction request signal from the point-of-sale terminal 150 verifies the transaction, and forwards a transaction verification signal to the management server 180. The management server 180 that receives the transaction verification signal, identifies the user corresponding thereto, and provides as one of the transaction signals, a first transaction response signal back to the mobile device 110.

In one embodiment, the first transaction response signal is communicated back to the mobile device 110 using a communication channel that is different from the communication channel used to initiate the transaction, which can have advantages. In another embodiment, different transaction response signals can be communicated back to the mobile device 110 using communication channels from the management server 180 to the radio element 120 associated with the device 110, as well as from the management server 180 to the secure element 130 through the POS terminal 150 or the POE terminal 190. Further detailed descriptions of these embodiments will be provided hereinafter.

Figure 2A:
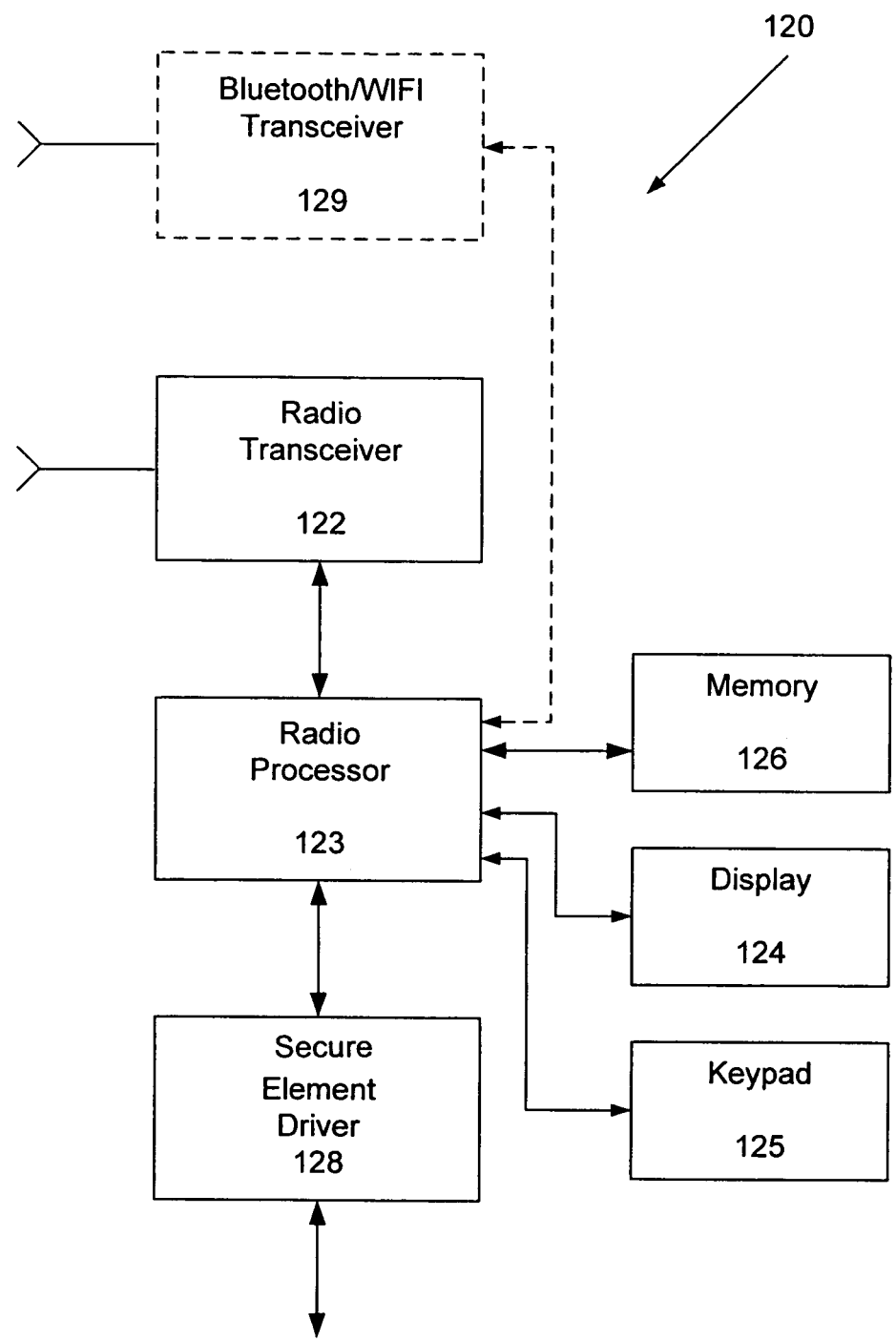

FIG. 2A illustrates a preferred embodiment of the radio element 120 associated with the mobile device 110, and illustrates the radio element 120 connected to the display 124 of the mobile device 110. As illustrated, the radio element 120 includes a radio transceiver 122 that is adapted to send outgoing voice and data signals and receive incoming voice and data signals over a radio communication channel. Such a radio communication channel is preferably a digital radio communication channel, such as CDMA or GSM. Such a radio communication channel has the capacity to communicate both voice and data messages using conventional techniques that need not be described further herein.

The radio transceiver 122 communicates with a radio processor 123, which processor has the capability to perform not only the radio communication services necessary to allow for phone and data communications, but can also execute various programs that are stored in the memory 126, which programs can receive inputs from the user via the display 124 and/or a keypad 125 associated with the mobile device 110.

Application programs running on the radio processor 123 are commonly BREW or J2ME applications and can encompass a broad array of application types. For example, current applications include games, enterprise applications, and multimedia applications. While all such applications can be used with the present invention, or particular significance with the present invention are applications, as described further herein, that provide movie & event information applications that provide for ticket, content, item and service purchases and payment management (wallet) applications.

The radio processor 123 also has the capability of recognizing secure communications, and transmits data which must be stored in a secure environment to the secure element driver 128, for transmission to the secure element 130, where, in this preferred embodiment, with both the radio element 120 and the secure element 130 being internal to the mobile device 110, such communicating takes place using an internal wired communication channel. The radio processor 123 also has the capability of receiving data from the secure element 130, in the same manner using the internal wired communication channel in this preferred embodiment as described. In a preferred embodiment the secure element 130 and the radio element 120 communicate using signals described in the Java Card 2.1 Platform API Specification.

Figure 4:
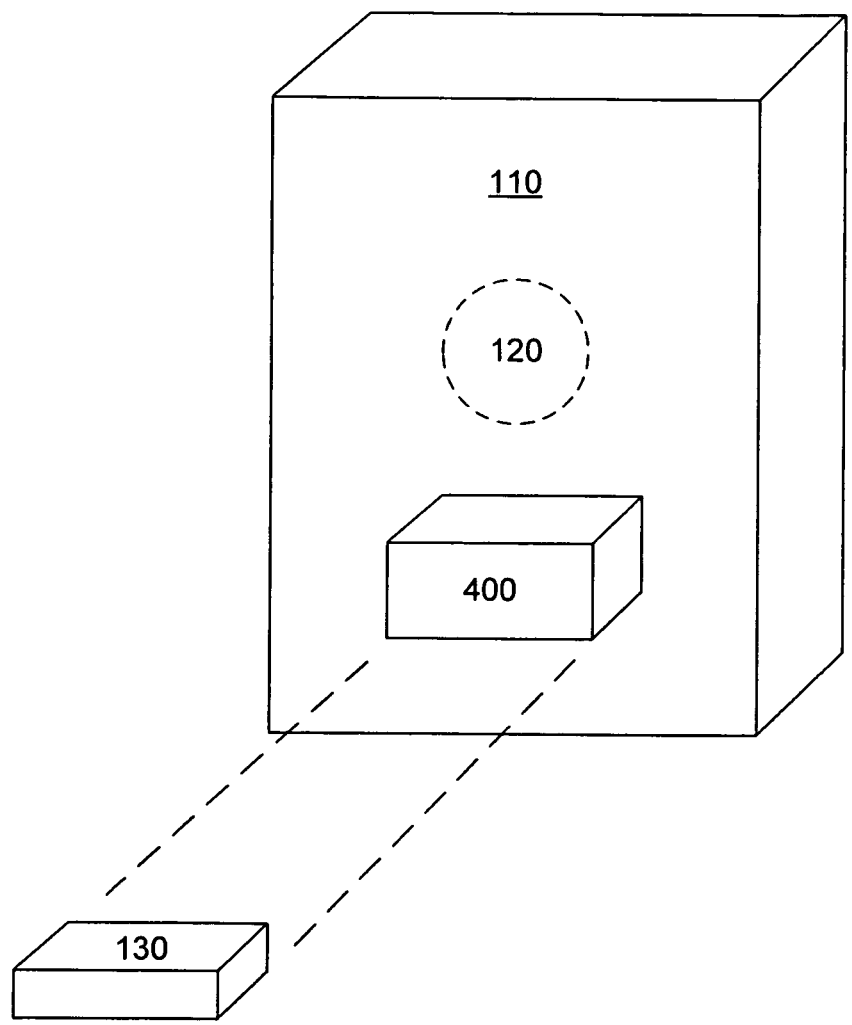
FIG. 4 illustrates another embodiment of a mobile device according to the present invention.

In a preferred embodiment, both the radio element 120 and the secure element 130 are both disposed internally within a body of the mobile device 110. In a variant implementation, illustrated in FIG. 4, the mobile device 110 contain a slot 400, which allows for the insertion of a secure element 130 into the slot 400 and thus the physical insertion, mechanical and electrical connection as needed. In this configuration, the secure element can be purchased independently of the mobile device 110. The secure element 130 can also be disposed into a slot 400 that only provides for physical insertion and mechanical connection to the body of the mobile device 110, and can then preferably include a transceiver that allows for the communication with the radio element 130 using a wireless local communication channel.

The radio element 120 also is illustrated as optionally including another transceiver 129, such as a Bluetooth or WIFI transceiver, which can transmit and receive signals with an external device and then communicate signals to and from the radio processor 123. This additional communication channel allows for communications between other external devices, such as an external Bluetooth enabled smartcard, and provides an additional communication channel that is useful for certain transactions, as described further herein.

FIG. 2B1 illustrates a preferred embodiment of the secure element 130 associated with the mobile device 110, the secure element 130 being commonly known as a smart card. As illustrated, the secure element 130 has a secure processor 132, a secure memory 133 and a POS transceiver 134 adapted to send transaction request signals and receive transaction response signals over a first communication channel. The secure processor 132 communicates via the secure element driver 128 with the radio processor 123, using, as mentioned above, signals described in the Java Card 2.1 Platform API Specification. The transaction request signals and the transaction response signals associated with the transaction preferably include identification code associated with the user, as well as information relative to the transaction, such as item, quantity, vendor, as is known. The POS transceiver 134 is preferably an NFC device of some type, which uses an NFC modem, although it can also be a Bluetooth, WIFI or other transceiver. In the case of the implementation of the POS transceiver being an NFC modem, such an NFC modem will typically have a set of registers that can be read/written by the secure processor 132. These registers are in turn available for reading and writing over the RFID communications channel and serve as a sort of shared memory between the secure processor 123 within the secure element 130 and the RFID reader that is associated with the POS terminal 150. This communication is specified, for example, in the ISO 14443A/B standard.

Illustrated in an alternative embodiment is the inclusion of a radio/Bluetooth/WIFI transceiver 136, which can communicate with other devices, such as a transceiver associated with the radio processor 120 or for other external devices having those communication capabilities, thus allowing for more flexibility.

FIG. 2B2A shows a modified secure element 130, in which the radio element 120 does not communicate with the secure element through a secure element driver 128 of some type. In this case, for example, the secure element 130 may be external to the mobile device 110 and as such is not connected to the radio element through the secure element driver 128. In such an implementation, however, if the transceiver 136 as described above is included, and a similar transceiver 129 associated with the radio element 130 as described previously with respect to FIG. 2A is included, then this communication channel can be used to wirelessly obtain direct communications between the radio element 120 and the secure element 130.

This implementation allows for certain bidirectional communications with other devices, as well as with the radio element 120, and as such more functionality and flexibility is achieved. This implementation is particularly useful since it establishes a direct local communication path with the radio element 120, since there is not communications with the radio element 120 via the path of driver 128.

If either of the transceivers 129 or 136 are not associated with the respective radio element 120 or secure element 130, and there is no direct connection between the radio element 120 an the secure element 130, then a direct communication link between the radio element 120 an the secure element 130 will not exist. As such, while ticketing and many transactions can still exist, data from a real-time transaction performed using the secure element 130 cannot be made directly available to the radio processor and the applications stored thereon, which can prevent, for example, certain redundancy checks to occur, such as a ticketing application in which, after the ticket order has been placed, the ticketing application in the memory 126 associated with the radio element 130 can be programmed to provide an alert if the ticket receipt, via the management server 180, has not been received within a certain period of time. Such an alert would not be possible to program directly (although it could be programmed indirectly via the button panel on the phone, though such an implementation requires extra user intervention, which, if possible, one attempts to avoid in transactions such as this.

FIG. 2B2B shows a modified secure element 130", in which the secure element does not include a processor that is capable of bidirectional communications, but instead is a passive device 138', such as an RFID sticker or some other tag, that allows for a user identification, such that a transaction that is initiated with the passive device 138' will cause the management server 180 to perform the transaction details. In this implementation, the code received from the POS terminal 150 or the POE terminal 190 is transmitted from the POS terminal 150 or the POE terminal 190 to the management server 190, which then takes over the transaction. This passive device 138', with the identification code stored thereon, can thus be associated with a mobile device 110 not otherwise equipped for such communications, and the management server 190 can provide transactional information to the mobile device 110 using available channels on the mobile device (such as audio, sms or other known data transmission methods). While bidirectional communications do not occur with other devices, transactions are possible, because the management server 190 is involved.

Figure 2C:
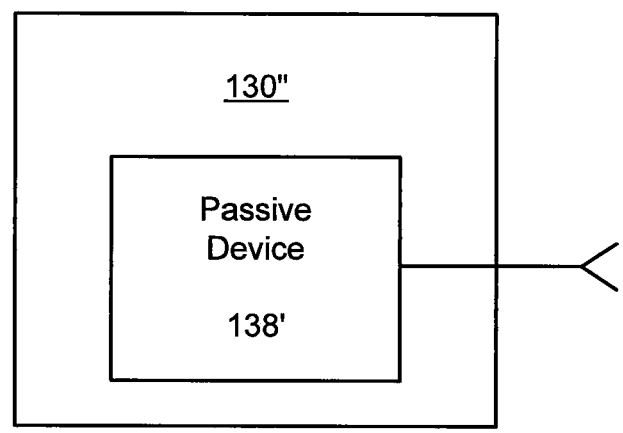
Figure 2C:
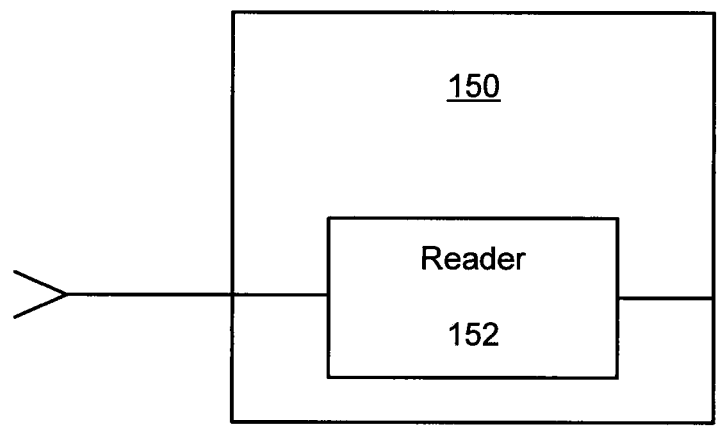
Figure 3A:
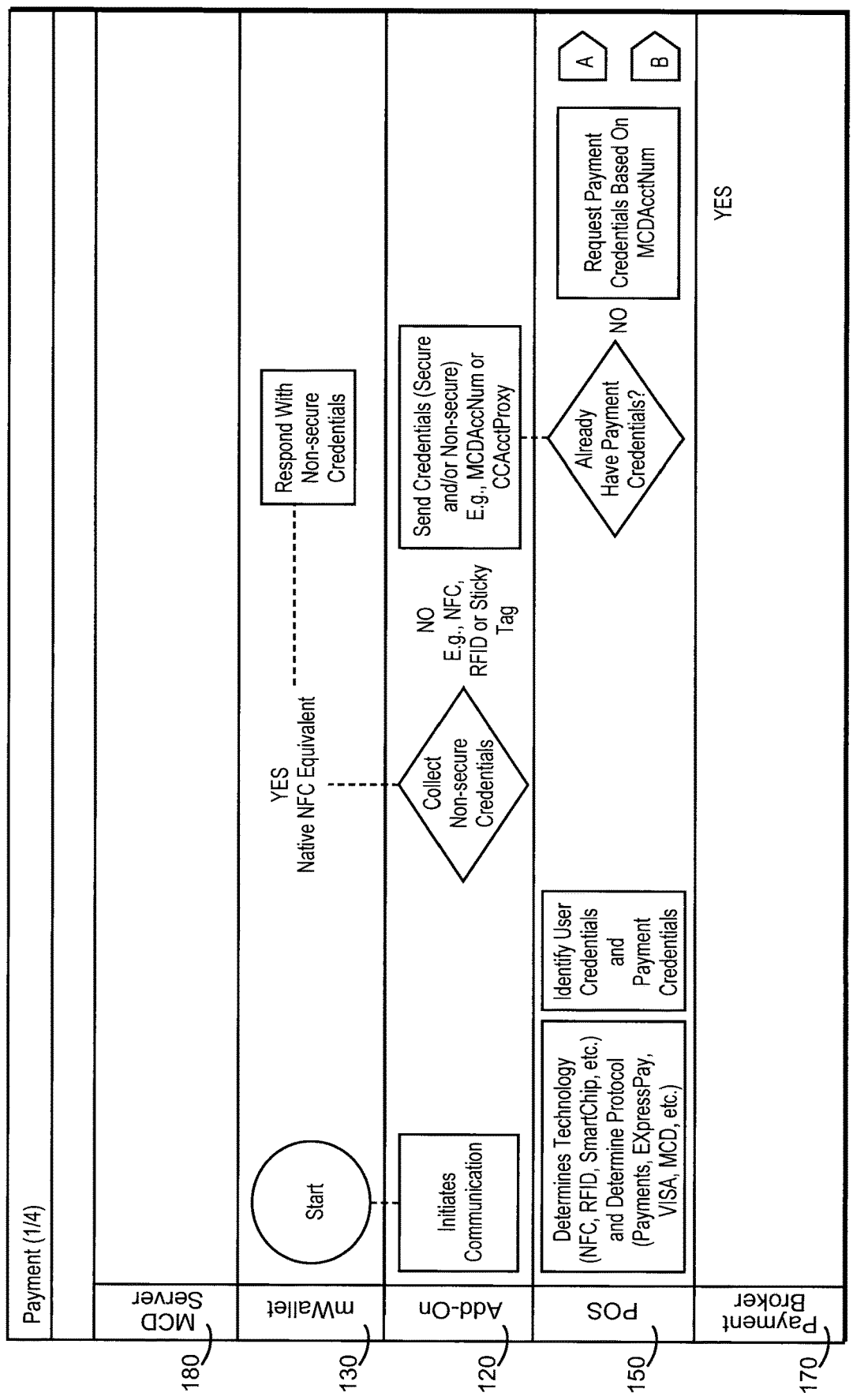
FIGS. 3A-3D provide a flowchart of a preferred embodiment for conducting a transaction according to the present invention.
Figure 3B:
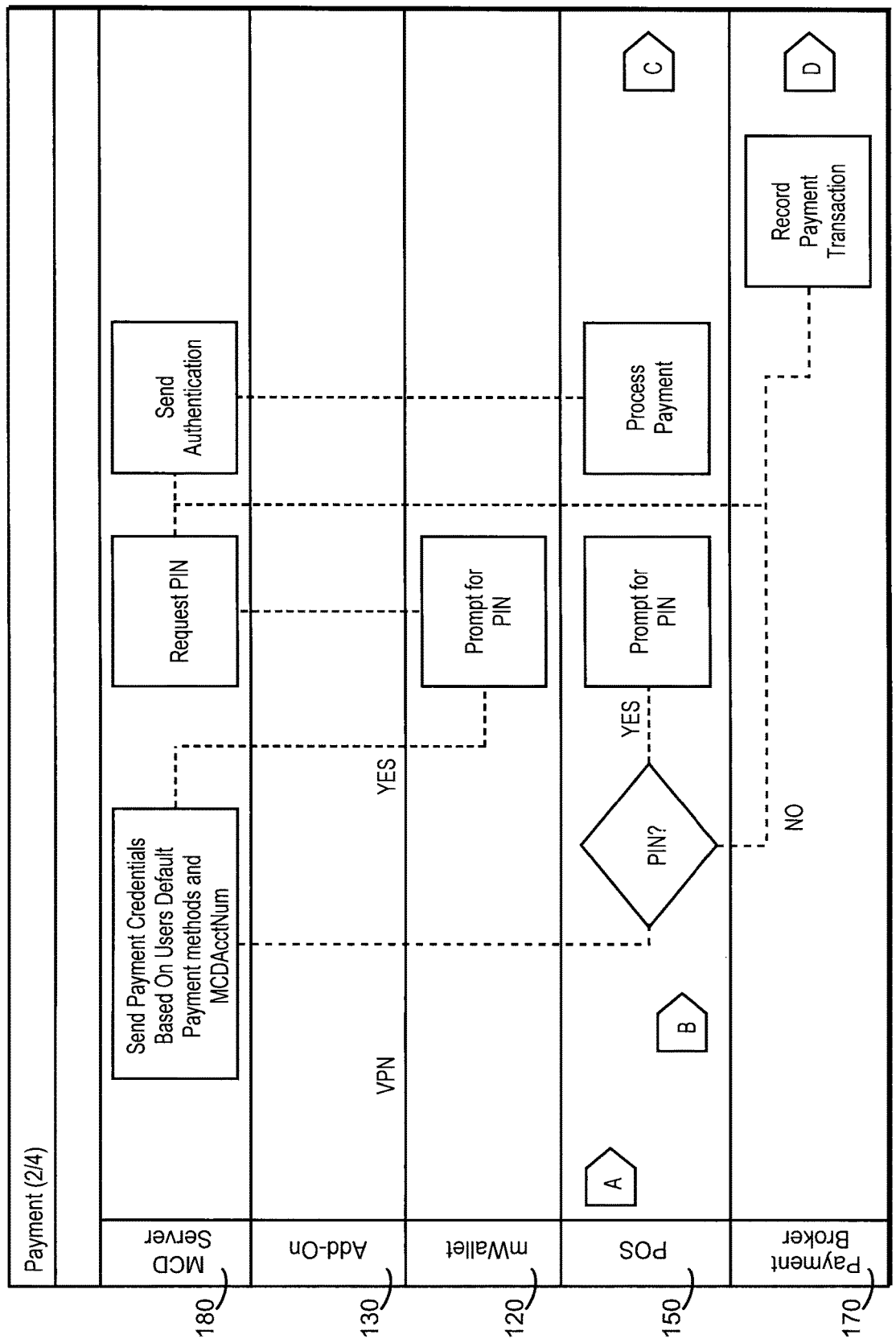
Figure 3C:
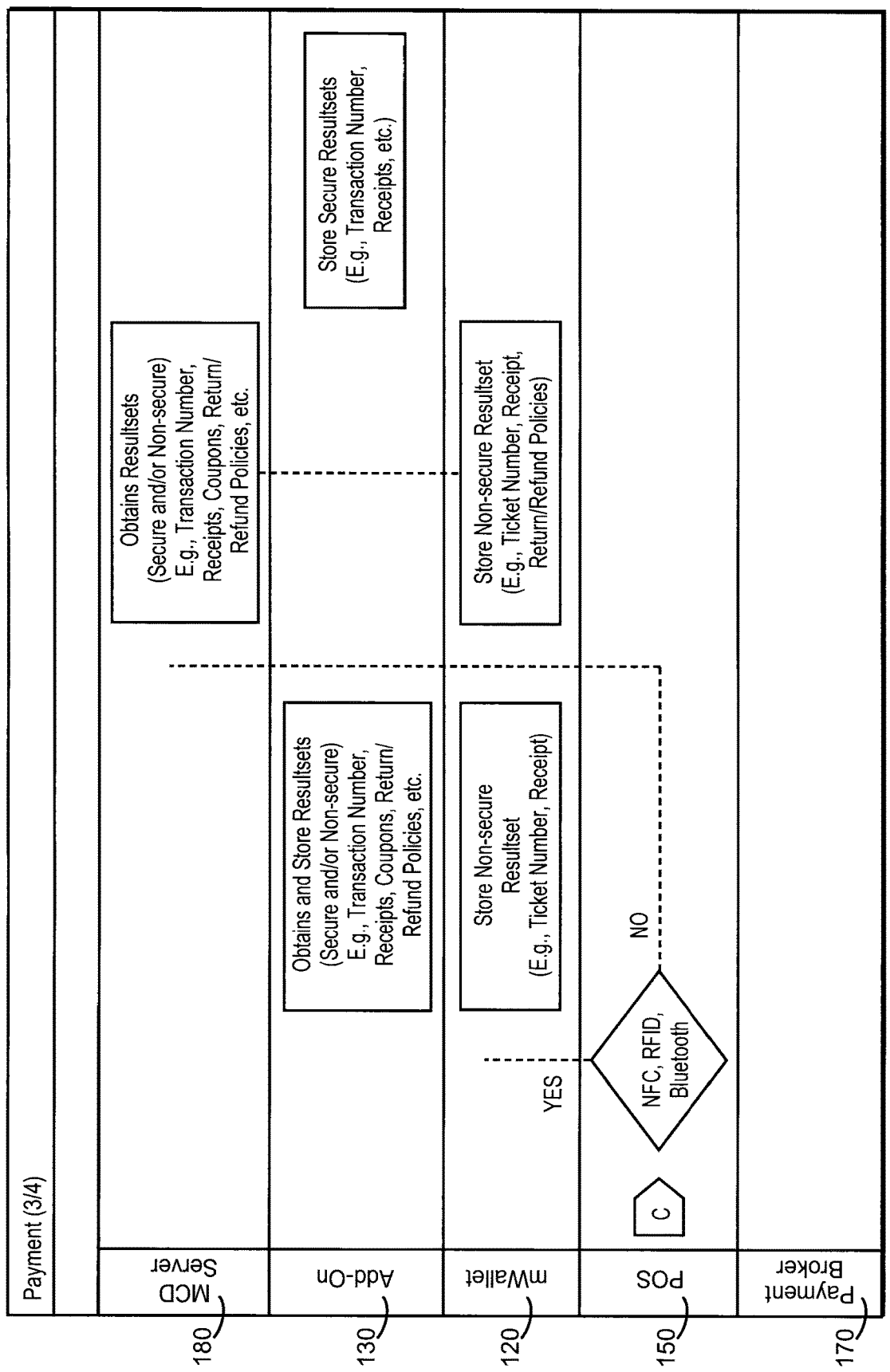
Figure 3D:
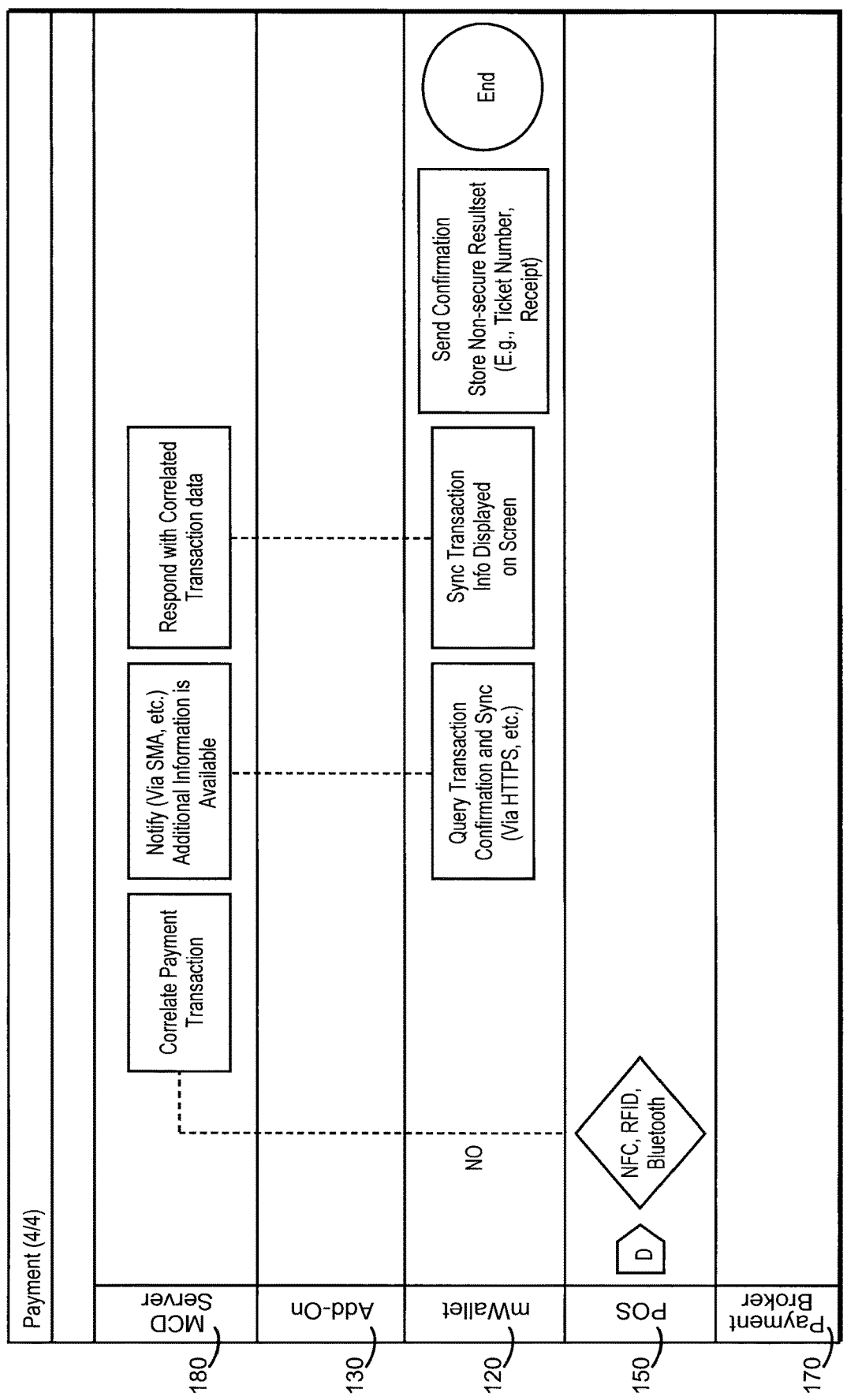

The point of sale terminal 150 illustrated in FIG. 2C is conventional, in that it has the capability of electronically reading information from a device equipped to transmit information in a format that it reads. Thus, the reader 152 within the point of sale terminal 150 can be of one or many types. If the point of sale terminal reader 152 includes the provision for NFC communications, then simply bringing the secure element 130 with the NFC transceiver will cause initiation of a transaction and the transmission of the identification code associated with the secure element 130 and thus the user.

For the embodiments described above, various software that is downloaded into the memory 126 of the radio element 120 and the secure memory 132 of the secure element 130, along with software resident on the management server 180, will cooperate at a layer that is above the physical layer of the communications, in order for the desired transaction to occur. This software is implemented using based upon known knowledge of mobile device 110 internals and application platforms, NFC, smartcard internals and application platforms, payment protocols (e.g. PayPass), and the working/workflow associated with POS and POE terminals, and the transaction and management servers. In addition, the present invention provides for piggybacking a tunneling protocol on top of the payment protocol, so that the secure elements 130 can communicate with the transaction server 170 and/or the management server 180, without modification to the POS terminal 150 or the POE terminal 190. As such, this includes software within the secure element 130 that embeds the required information in fields which will not adversely affect the performance of the POS terminal 150 and/or the POE terminal 190, and also software in transaction server 170 that will extract the piggybacked payload, associate the payload with the management server 180 if needed, and then authenticate, authorize, and execute transfers of transaction information to the management server 180.

In another embodiment, the piggybacked payload is sent, instead of to the transaction server 170, to the management server 180, which can then associate the transaction and notify the transaction server 170, the POS terminal 150 and/or the POE terminal as needed.

Another significant aspect of the present invention is that the management server 180 has the capability of storing codes that are from a variety of different mobile devices. Thus, codes that are associated with a smart card having an RFID can be stored, as can be codes stored from an RFID sticker, as well as codes that are associated with a smart card that communicates using a slide reader, Bluetooth, or an NFC channel, for example. As such, the management server 180 can store user personal and credit and transactional information and history, including a code associated with the user, for a variety of different mobile devices, thereby allowing a system which can scale.

FIGS. 3A-3D illustrate a flowchart of the present invention, and the various steps that are included in a particular transaction, with reference to which of the various devices are implementing this step. As the flowchart is self-explanatory, a further discussion is not provided herein.

The present invention, as described previously, allows for various different programs to exist within the memory 126 of the radio element 120, as well as in the secure memory 132 of the secure element 130, as mentioned above.

The present invention can also be interfaced with certain known and implanted payment protocols, such as Paypass. For implementing these additional payment protocols, implementation of streaming communication protocols (in the full NFC case), protocols for session setup, and configuration of communications modules and secure data areas as needed is necessary, taking into account the communication protocol used (e.g. NFC, Bluetooth, WIFI, CDMA, 3$^{rd}$ Generation CDMA for example) as well as file transfer protocols and facilities access protocols. In particular, in implementing such protocols, it is preferable to provide for the ability to extract transaction information from the POS terminal 150 to the secure element 130 during the course of the local interaction between the POS terminal 150 and the secure element 130. For instance, the implementation of PayPass within the invention will take note, and alert the application running on the radio processor 123 that a purchase or purchase attempt has occurred, as noted above in the context of the alert discussion. It is also preferable to provide the ability to augment the information passed via the PayPass protocol to the POS terminal 150 and thence to the transaction server 170 with additional fields containing the elements of the tunneling protocol, for subsequent processing by the transaction server 170, either directly, or through the management server 180, as described above.

The two transaction workflows that have been specifically discussed above are the credit card and ticketing workflows. Other transaction flows are also intended within the scope of the invention. Debit card and cash card transactions are similar to credit card transactions, with variations being implemented to account for the differences that exist in those types of transactions, which types of transactions are well understood. Coupons can be implemented with the invention, in much the same manner as tickets, though coupons can be transmitted without there being payment.

Many of the transaction types noted herein will, as is apparent, require communication between the secure element 130 and the radio element 120. As such, due to that requirement, a significant part of the preceding discussion has been directed to how to implement that communication, particularly for mobile devices 110 that are not manufactured to allow for such communications.

An example of a typical transaction requiring such communication between the secure element 130 and the radio element 120 is one in which the POS terminal 150 allows for the transfer of detailed purchase information from the POS terminal 150 to the secure element 130, as well as transactional information from the POS terminal 150 and/or the transaction server 170 to the management server 180. The management server 180 can then also communicate with the radio element 120 via the radio channel. This allows for the matching and reconciliation of detailed purchase information and, if the transaction fails, failure details can be matched to the purchase information, and forwarded in real-time to the user via the radio element 120.

In another embodiment of the invention, there is included the provision for different phones to communicate the results of a transaction, particularly using the POS transceiver or one of the Bluetooth/Wifi transceivers. In this embodiment, after a transaction has been completed with one of the mobile devices 110$a$, another mobile device 110$b$ can receive information regarding the transaction completed. Thus, for instance, if mobile device 110$a$ purchases two tickets, one of the tickets can be transmitted to the mobile device 11$b$ by each using a POS transceiver or one of the Bluetooth/Wifi transceivers.

Although the present invention has been particularly described with reference to embodiments thereof, it should be readily apparent to those of ordinary skill in the art that various changes, modifications and substitutes are intended within the form and details thereof, without departing from the spirit and scope of the invention. Accordingly, it will be appreciated that in numerous instances some features of the invention will be employed without a corresponding use of other features. Further, those skilled in the art will understand that variations can be made in the number and arrangement of components illustrated in the above figures. It is intended that the scope of the appended claims include such changes and modifications.

What is claimed:

1. A method for conducting a Near Field Communication (NFC) transaction using an NFC protocol, the method comprising:

maintaining an identification code associated with a user and a secure element application configured to use the NFC protocol in a secure element memory, the secure element memory, a secure element processor and a secure element transceiver supporting a first communication channel comprising the NFC protocol included in a secure element embedded within the body of a mobile device, the mobile device comprising of a mobile device memory, a mobile device processor, and a mobile device wireless transceiver;

executing the secure element application in response to a near field communication inductive signal by an NFC terminal;

wirelessly transmitting, using the secure element application, a transaction request including the identification code associated with the user via the secure element transceiver over a first communication channel to the NFC terminal in response to the near field communication inductive signal by the NFC terminal, wherein the transaction request including the identification code associated with the user is transmitted over a second communication channel that is different than the first communication channel to a server for processing the NFC transaction using a payment method stored at the server that corresponds to the identification code associated with the user, wherein the NFC terminal and the first communication channel is configured to use the NFC protocol; and after a payment has been processed by the server, receiving a transaction response at the mobile application from the server over the second communication channel.

2. The method of claim 1, further wherein the secure element receives the transaction response from the server via the NFC terminal during an NFC inductive interaction between the secure element and the NFC terminal.

3. The method of claim 1, wherein the transaction response comprises at least one of a transaction number, receipt, ticket, coupon, or content.

4. The method of claim 1, further wherein the secure element application operates above a physical level to enable the NFC transaction.

5. The method of claim 1, wherein the payment method is a credit card, debit card, or cash card.

6. The method of claim 1, further wherein during the NFC transaction, a coupon is automatically applied during an NFC inductive interaction between the secure element and the NFC terminal.

7. The method of claim 1, further wherein based on information related to the identification code, the NFC terminal transmits the identification code to a specific server for processing the NFC transaction using the payment method stored at the server that correspond to the identification code.

8. The method of claim 1, further wherein, the transaction response is based on the server correlating the identification code associated with the user, information related to the payment method, information related to a user, information related to the NFC transaction, and information related to transaction history.

9. The method of claim 1, further wherein the, mobile application sends an alert to the server if it has not received the transaction response from the server within a certain period of time.

10. The method of claim 2, further wherein, the mobile application receives the transaction response from the secure element using an internal wired communication channel between the secure element and the mobile device and further wherein mobile application sends an alert to the server if the mobile device has not received the transaction response from the secure element within a certain period of time.

11. The method of claim 1, further wherein the server is configured to store a single identification code associated with the user for a variety of the user's mobile devices.

12. The method of claim 1, further wherein the NFC application is executed without using the mobile device processor.

13. The method of claim 1, wherein the server verifies information related to the transaction request.

14. A mobile device using a Near Field Communication (NFC) protocol to conduct an NFC transaction, the mobile device comprising:

a mobile device memory;

a mobile device processor;

a secure element permanently embedded within the body of the mobile device, the secure element including a secure element memory that maintains an identification code associated with a user and a secure element application configured to use the NFC protocol, a secure element processor, a secure element transceiver supporting a first communication channel comprising the NFC protocol, wherein the secure element application is executed in response to a near field communication inductive signal by an NFC terminal and the secure element application wirelessly transmits a transaction request including the identification code associated with the user over a first communication channel via the secure element transceiver to the NFC terminal in response to the near field communication inductive signal by the NFC terminal, further wherein the transaction request including the identification code associated with the user is transmitted over a second communication channel that is different from the first communication channel to a server for processing of the NFC transaction using a payment method stored at the server that corresponds to the identification code associated with the user, the NFC terminal and first communication channel configured to use the NFC protocol; and a mobile device wireless transceiver, that after a payment has been processed by the server, receives a transaction response from the server over the second communication channel.

15. The mobile device of claim 14, further wherein, the secure element receives the transaction response from the server via the NFC terminal during an NFC inductive interaction between the secure element and the NFC terminal.

16. The mobile device of claim 14, wherein the transaction response comprises at least one of a transaction number, receipt, ticket, coupon, or content.

17. The mobile device of claim 14, further wherein the secure element application operates above a physical level to enable the NFC transaction.

18. The mobile device of claim 14, wherein the payment method is a credit card, debit card, or cash card.

19. The mobile device of claim 14, further wherein during the NFC transaction, a coupon is automatically applied during an NFC inductive interaction between the secure element and the NFC terminal.

20. The mobile device of claim 14, further wherein based on information related to the identification code, the NFC terminal transmits the identification code to a specific server for processing the NFC transaction using the payment method stored at the server that corresponds to the identification code.

21. The mobile device of claim 14, further wherein, the transaction response is based on the server correlating the identification code associated with the user, information related to the payment method, information related to the user, information related to the NFC transaction, and information related to transaction history.

22. The mobile device of claim 14, further wherein the, mobile application sends an alert to the server if it has not received the transaction response from the server within a certain period of time.

23. The mobile device of claim 15, further wherein, the mobile application receives the transaction response from the secure element using an internal wired communication channel between the secure element and the mobile device and further wherein the mobile application sends an alert to the server if the mobile device has not received the transaction response from the secure element within a certain period of time.

24. The mobile device of claim 14, further wherein the server is configured to store a single identification code associated with the user for a variety of the user's mobile devices.

25. The mobile device of claim 14, further wherein the NFC application is executed without using the mobile device processor.

26. The mobile device of claim 14, wherein the server verifies information related to the transaction request.

* * * * *